United States Patent
Karapantelakis et al.

(10) Patent No.: US 10,530,767 B2
(45) Date of Patent: Jan. 7, 2020

(54) METHODS AND USER DEVICE AND AUTHENTICATOR DEVICE FOR AUTHENTICATION OF THE USER DEVICE

(71) Applicant: TELEFONAKTIEBOLAGET LM ERICSSON (PUBL), Stockholm (SE)

(72) Inventors: Athanasios Karapantelakis, Stockholm (SE); Niclas Jonasson, Stockholm (SE); Anna Viggedal, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 15/559,854

(22) PCT Filed: Mar. 23, 2015

(86) PCT No.: PCT/SE2015/050340
§ 371 (c)(1),
(2) Date: Sep. 20, 2017

(87) PCT Pub. No.: WO2016/153398
PCT Pub. Date: Sep. 29, 2016

(65) Prior Publication Data
US 2018/0063126 A1    Mar. 1, 2018

(51) Int. Cl.
*H04L 9/00* (2006.01)
*H04L 29/06* (2006.01)
*H04W 12/06* (2009.01)

(52) U.S. Cl.
CPC ...... *H04L 63/0838* (2013.01); *H04L 63/0853* (2013.01); *H04W 12/06* (2013.01)

(58) Field of Classification Search
USPC .............................................................. 726/7
See application file for complete search history.

(56) References Cited

U.S. PATENT DOCUMENTS

2004/0133789 A1* 7/2004 Gantman ............... G06F 21/34
                                                        713/189
2004/0221166 A1   11/2004 Steenstra et al.
(Continued)

FOREIGN PATENT DOCUMENTS

WO         0051280 A2     8/2000

OTHER PUBLICATIONS

International Search Report and Written Opinion issued in Application No. PCT/SE2015/050340 dated Dec. 4, 2015, 11 pages.
(Continued)

*Primary Examiner* — Christopher J Brown
(74) *Attorney, Agent, or Firm* — Rothwell, Figg, Ernst & Manbeck, P.C.

(57) ABSTRACT

A method and a user device (110) for authentication of the user device (110) as well as a method and an authenticator device (120) for authentication of the user device (110) are disclosed. The user device (110) generates (A030) a one-time password. The user device (110) sends (A040), to an authenticator device (120), the one-time password as an acoustic signal, wherein the acoustic signal comprises a frequency within an ultrasound range or an infrasound range. The authenticator device (120) receives (A050), from the user device (110), the one-time password. The authenticator device (120) validates (A060) the one-time password.

19 Claims, 5 Drawing Sheets (56) References Cited

U.S. PATENT DOCUMENTS

2012/0221859 A1* 8/2012 Marien .................. G06F 21/34
                                                          713/172
2013/0159179 A1   6/2013 Choi et al.
2014/0085048 A1   3/2014 Hadizad
2014/0109211 A1   4/2014 Suzuki et al.

OTHER PUBLICATIONS

The Extended European Search Report issued in Application No. 15886617.8 dated Jan. 23, 2018, 7 pages.

* cited by examiner

Fig. 8

METHODS AND USER DEVICE AND AUTHENTICATOR DEVICE FOR AUTHENTICATION OF THE USER DEVICE

CROSS REFERENCE TO RELATED APPLICATION(S)

This application is a 35 U.S.C. § 371 National Stage of International Patent Application No. PCT/SES2015/050340, filed Mar. 23, 2015, designating the United States, the disclosure of which is incorporated by reference.

TECHNICAL FIELD

Embodiments herein relate to authentication systems, such as access systems, bank login systems, user verification systems and the like. In particular, a method and a user device for authentication of the user device as well as a method and an authenticator device for authentication of the user device are disclosed. A corresponding computer program and a carrier therefor are also disclosed.

BACKGROUND

Authentication systems are used in a wide range of applications, ranging from Automatic Teller Machines (ATM), web-login to services, authorization for opening of doors, gates and the like, to identification of persons allowed to operate a certain machine. These systems include one-step authorization systems and two-stage authorization systems.

An existing one-step authorization system comprises a first device that controls opening/closing of a door. The first device allows a person, who wishes to enter the door, to enter a one-time password into a keypad of the first device.

The one-time password can be retrieved from a scratch-card, which includes hidden one-time passwords. By scratching off a surface hiding the one-time password, a one-time password to be used can be scratched visible. There also exist known electronic devices that can provide these one-time passwords. With such electronic devices, the one-time password is displayed on a screen of the electronic device.

If the one-time password is correct, the door will be allowed to be operated according to the desire of the user. This means that the first device has authorized the user to operate the door in only one step, i.e., the verification of the one-time password.

In an existing two-stage authorization system, there is a further authentication means in addition to the one-time password mentioned above for the one-step authentication system. In case the two-stage authorization system includes an ATM, the further authentication means is usually provided by means of possession of a credit card. Thus, in addition to the one-time password, a second authentication step is performed, i.e., the two-stage authorization system further checks that a user, that e.g., wishes to withdraw money, also has possession of the credit card by allowing the user to insert the card into the machine.

With both one-step and two-stage authorization systems, a problem may be that it is cumbersome for the user to enter the one-time password.

In order to solve this problem, it has been proposed to provide a Universal Serial Bus (USB)-stick that can generate a one-time password. The USB-stick is inserted into a Personal Computer (PC), which recognizes the USB-stick as a USB-keyboard. The USB-stick further includes a button that may be pressed by a user of the PC. Upon authentication at a web-site, the user will thus ensure that the USB-stick is inserted into the PC and that username is entered at the web-site's login screen. Moreover, the user ensures that the cursor is active at a password field of the login screen. Then, the user presses the button, whereby a one-time password, generated by the USB-stick, is automatically entered, i.e., the user does not type the one-time password using a regular keyboard, into the password field thanks to that the USB-stick simulates the keyboard. A disadvantage with this USB-stick is that the user needs activate the correct field at the login screen of the web-site. A further disadvantage is that the user needs to bring an additional unit, i.e., the USB-stick, in addition to a PC or similar client equipped with a USB port. The process is non-automated as it requires a number of manual actions on behalf of the user, including attaching the USB drive to the USB port and pressing the button. This limits the applicability of this solution to manual authentication scenarios.

SUMMARY

An object may be to facilitate authentication by means of a one-time password.

According to an aspect, the object is achieved by a method, performed by a user device, for authentication of the user device. The user device generates a one-time password. The user device sends, to an authenticator device, the one-time password as an acoustic signal, wherein the acoustic signal comprises a frequency within an ultrasound range or an infrasound range.

According to another aspect, the object is achieved by a user device configured for authentication of the user device. The user device is configured for generating a one-time password. Moreover, the user device is configured for sending, to an authenticator device, the one-time password as an acoustic signal, wherein the acoustic signal comprises a frequency within an ultrasound range or an infrasound range.

According to a further aspect, the object is achieved by a method, performed by an authenticator device, for authentication of a user device. The authenticator device receives, from the user device, a one-time password as an acoustic signal, wherein the acoustic signal comprises a frequency within an ultrasound range or an infrasound range. The authenticator device validates the one-time password.

According to yet another aspect, the object is achieved by an authenticator device configured for authentication of a user device. The authenticator device is configured for receiving, from the user device, a one-time password as an acoustic signal, wherein the acoustic signal comprises a frequency within an ultrasound range or an infrasound range. Moreover, the authenticator device is configured for validating the one-time password.

The user device sends the one-time password to the authenticator device as an acoustic signal. In this manner, according to one example, a user of the user device is not required to type in the one-time password at a keyboard of the authenticator device. Instead, the one-time password may be encoded into the acoustic signal, which may be transmitted by a speaker of the user device. Correspondingly, at the authenticator device, the acoustic signal may be received by a microphone of the authenticator device. Therefore, authentication by means of the one-time password is facilitated.

Furthermore, an advantage is that many existing devices, such as the user device and the authenticator device, include the requisite hardware, e.g., the speaker and/or the microphone. Generally, the user device and the authenticator device are capable of sending and/or receiving the acoustic signal, again typically by means of the speaker and/or the microphone. Wide availability of speakers and/or microphones in various devices implies that the embodiments herein are applicable to a number of scenarios without a need for hardware changes.

A further advantage is, as mentioned above, that manual input of the one-time password is not required in order to transfer the one-time password from the user device, generating the one-time password, to the authenticator device. In this way, the embodiments herein may simplify handling for the user and save time for the user.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
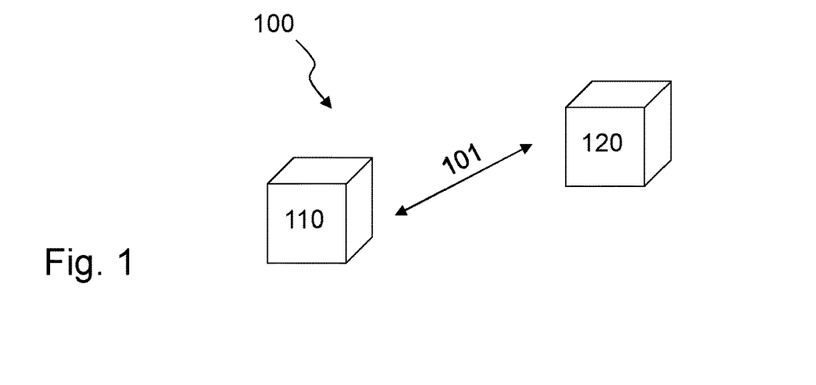
FIG. 1 is a schematic overview of an exemplifying system in which embodiments herein may be implemented.

FIG. 1 depicts an exemplifying system 100 in which embodiments herein may be implemented.

The system 100 comprises a user device 110. As will be described in more detail with reference to FIG. 6, the user device 110 may comprise a speaker device, or speaker, for generating, or sending, acoustic signals. Additionally, the user device 110 may comprise a microphone for receiving acoustic signals.

As used herein, the term "user device" may refer to a user equipment, a machine-to-machine (M2M) device, a mobile phone, a cellular phone, a Personal Digital Assistant (PDA), a smartphone, a laptop or personal computer (PC), a tablet PC, a portable electronic radio communication device or the like. The term "user" may indirectly refer to the user device. Sometimes, the term "user" may be used to refer to the user equipment or the like as above. It shall be understood that the user may not necessarily involve a human user. The term "user" may also refer to a machine, a software component or the like using certain functions, methods and similar.

Moreover, the system 100 comprises an authenticator device 120. As will be described in more detail with reference to FIG. 8, the authenticator device 120 may comprise a microphone for receiving acoustic signals. Furthermore, the authenticator device 120 may comprise a speaker for sending acoustic signals.

As used herein, the term "authenticator device" may refer to an ATM, a hotel reservation authenticator, a door lock authenticator, a car ignition system authenticator, a micropayments authenticator, public transport authenticator, a PC for which authentication is required before a user can access the PC and the like.

The user device 110 may communicate 101 with the authenticator device 120. The communication 101 may be carried by a wired or wireless connection, such as telephone networks, fiber-optic networks, cellular networks, Wireless-Fidelity (Wi-Fi) networks, radio communication networks and the like.

Figure 2:
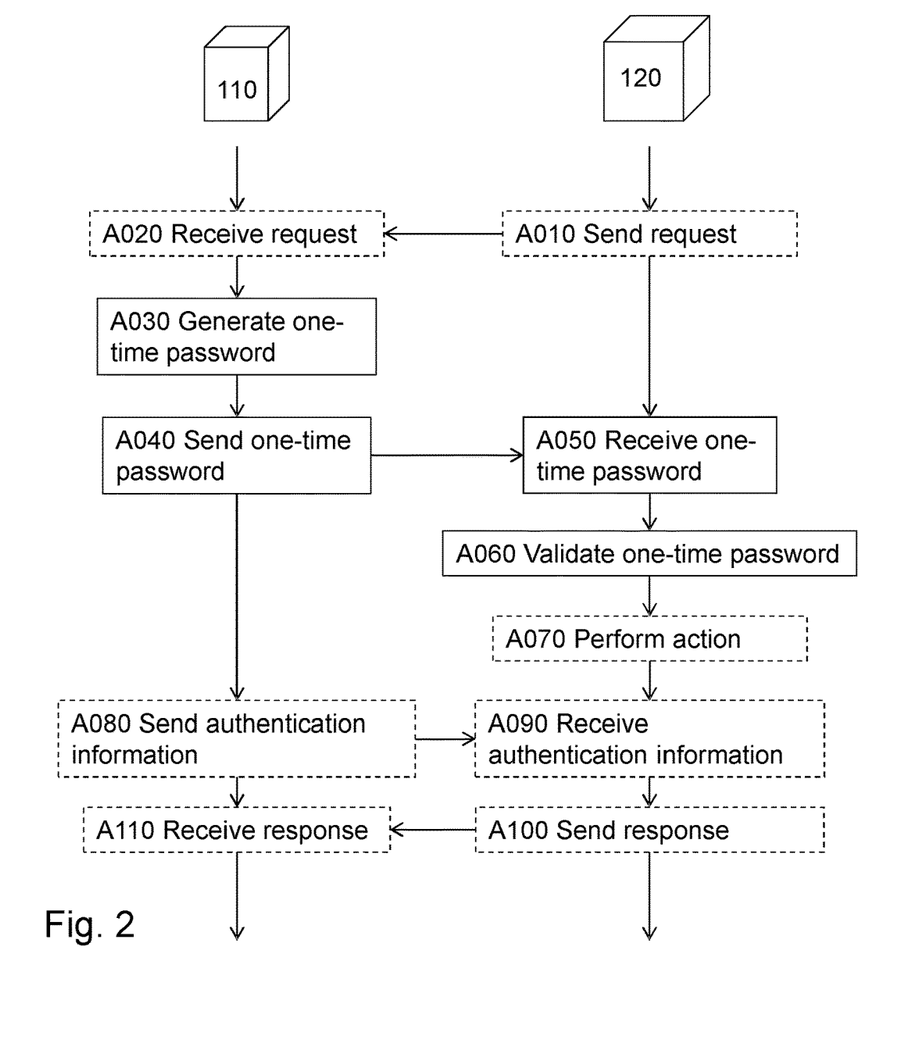
FIG. 2 is a combined signaling and flowchart illustrating the methods herein.

FIG. 2 illustrates an exemplifying method according to embodiments herein when performed in connection with the system 100 of FIG. 1. The user device 110 performs a method for authentication of the user device 110. The authenticator device 120 performs a method for authentication of the user device 110.

One or more of the following actions may be performed in any suitable order.

Action A010

The authenticator device 120 may send, to the user device 110, a request for the one-time password. The request may preferably be sent as an acoustic signal similarly to a one-time password in action A040. The acoustic signal of action A010 is different from the acoustic signal of action A040. Hence, the acoustic signal of action A010 may be referred to as a first acoustic signal and the acoustic signal of action A040 may be referred to as a second acoustic signal.

The request may comprise one or more of: time of the request, location of the authenticator device 120 and identity of the authenticator device 120. As an example, the request may be a request message, which includes one or more of a first parameter indicating a point in time at which the request was sent from the authenticator device, a second parameter indicating a location of the authenticator device 120 and a third parameter indicating an identity of the authenticator device 120.

The point in time may be given as a year, a month, a day, a time of the day, e.g., in hours, and optionally in minutes and/or seconds.

As an example, the location may be a geographical location. The geographical location may be given with an arbitrary precision, such as in terms of which continent, country, part of country, and/or longitude and latitude the authenticator device is located in or at. Alternatively or additionally, the location may be an environmental location. The environmental location may be indoors, outdoors, in a forest, in a city, at home, in an office, at school, etc.

As an example, the identity of the authenticator device 120 may specify that the authenticator device 120 may be a hotel reservation authenticator, a door lock authenticator, a car ignition system authenticator, a micropayments authenticator, public transport authenticator, etc.

Action A010 may be triggered by that the authenticator device 120 detects that the user device 110 is in the proximity of the authenticator device 120. The proximity detection may be achieved by that the authenticator device 120 receives a wireless beacon signal from the user device 110. This may for example mean that the authenticator device 120 may include a wireless access point to which the user device 110 may have connected. Thus, up on establishment of the connection, action A010 may be performed. A measurement of signal strength from the user device 110 may be preferred in order to ensure that a distance between the authenticator device 120 and the user device 110 is not too large; typically the distance should be less than a few meters, such as less than 1, 2 or 3 meters.

Action A020

Subsequently to action A010, the user device 110 may receive the request for the one-time password from the authenticator device 120.

Action A030

The user device 110 generates a one-time password. There exists many known manners of how to generate a one-time password. For example, a number of a quasi-random sequences may be used as the one-time password.

The one-time password, sometimes referred to as a token or security token, may be a sequence of characters, such as numbers, alphanumeric, bits etc.

When action A020 has been performed, the user device 110 may generate the one-time password based on the request. This may e.g., mean that the user device 110 may generate the one-time password based on the time of the request, the location of the authenticator device 120 and the identity of the authenticator device 120.

Action A040

The user device 110 sends, to an authenticator device 120, the one-time password as an acoustic signal. For example, the one-time password may be sent in the form of an acoustic signal, in which the one-time password may have been modulated. See also section "Modulating the one-time password into the acoustic signal" below.

The acoustic signal, both the first and second acoustic signals as mentioned above, comprises a frequency within an ultrasound range or an infrasound range. In general, the human auditory system is capable of hearing frequencies in the range of 20-20 000 Hz. The ultrasound range may comprise frequencies above 20 000 Hz, e.g., 20 000 Hz to 25 000 Hz. In one example, the range may be 21 000 Hz to 23 000 Hz. In this example, it can be said that a margin of 1000 Hz have been applied, i.e., 21 000-20 000 Hz. In this way, the range is distanced from the audible spectrum to ensure that a user cannot hear, or be disturbed by the acoustic signal, e.g., carrying the one-time password. Moreover, the range may be dependent of capabilities of the user device 110. If, for example, the user device 110 is only capable of generating acoustic signals up to 22 000 Hz, the range may be 20 500-22 000 Hz, while having a margin of 500 Hz. Further ranges are possible as required by capability of the user device 110 or choice of margin. The infrasound range may comprise frequencies below 20 Hz, e.g., 1 Hz to 20 Hz. Similarly to the ultrasound range, the infrasound range may be e.g., 1-12 Hz, 5-10 Hz depending of choice of margin for the ultrasound range and capability of the user device 110.

Action A030 and/or action A040 may be triggered by that the user device 110 detects that the user device 110 is in the proximity of the authenticator device 120. The proximity detection may be achieved by that the user device 110 receives a wireless beacon signal from the authenticator device 120. This may for example mean that the authenticator device 120 may include a wireless access point to which the user device 110 may have connected. Thus, up on establishment of the connection, action A030/A040 may be performed. A measurement of signal strength of the wireless beacon signal may be preferred in order to ensure that a distance between the authenticator device 120 and the user device 110 is not too large. Typically, the distance should be less than a few meters, such as less than 1, 2 or 3 meters. The proximity detection may also, or as an alternative, be performed by that the user device 110 detects its position by e.g., a Global Positioning System (GPS) unit, which may be included in the user device 110. When using the GPS unit as means for proximity detection, position information about the authenticator device's position may previously, e.g., before action A030, have been provided, such as stored in a memory of the user device 110, to the user device 110.

According to some embodiments herein, variable amplitude of the acoustic signal may be provided. In this manner, a distance, e.g., determining required proximity, may be adjusted, e.g., proportionally to amplitude, from a few centimeters to one or several meters.

Action A050

Subsequent to action A040, the authenticator device 120 receives, from the user device 110, the one-time password as the acoustic signal, wherein the acoustic signal comprises a frequency within an ultrasound range or an infrasound range.

Action A060

The authenticator device 120 validates the one-time password. An outcome of the validation may be a success or a failure. The success may indicate that the user device 110 is authorised, and recognized, by the authenticator device 120. Typically, this means that the received one-time password matched an expected one-time password that the authenticator device expects to receive from the user device 120. The failure may indicate that the user device 110 is not authorised, and thus not recognized, by the authenticator device 120.

The validating A060 of the one-time password may be based on one or more authenticator parameters, wherein the one or more authenticator parameters may comprise location of the authenticator device 120 and/or identity of the authenticator device 120.

The validating A060 of the one-time password may be based on the request.

Action A070

The authenticator device 120 may perform an action based on the outcome of Action A060. Thus, action A070 may preferably be performed after action A060.

A few examples of the action include:
 mechanical actuation, for example an opening of a door, typically up on successful validation in action A060,
 completion of an electronic payment transaction, after successful authentication to an electronic payment system (e.g., a bank, retail supplier, etc.),
 an alarm notification sent to a surveillance center, typically up on failed validation in action A060,
 a visual or audio notification to the user, e.g., red for failed validation and green for successful validation,
 and the like.

Action A080

In some embodiments, a two-stage authentication may be performed. In these embodiments, the user device 110 may send, to the authenticator device 120, authentication information, being independent of the one-time password. The authentication information may uniquely identify the user device 110, or maybe even the user thereof. The authentication information may identify the user by for example a credit card number, owner name of credit card and 3-digit security number of credit card (CVS), a social security number, a passport number, etc.

The authentication information is independent of the one-time password in that the authentication information may not be derived from the one-time password. Conversely, the one-time password may also not be derived from the authentication information. Thanks to the independence between the authentication information and the one-time password, the two-stage authentication is achieved.

Action A090

Subsequent to action A080, the authenticator device 120 may receive, from the user device 110, the authentication information. This action may be performed before action A070, when action A070 is made dependent upon a further validation of the authentication information. See also a two-stage authorization example in conjunction with FIGS. 3 and/or 4.

Action A100

The authenticator device 120 may send a response, indicating success or failure of the authentication, to the user device 110. Action A100 is preferably performed after action A060. The response may relate to authentication by means of the one-time password and/or by means of the authentication information.

Action A110

Subsequent to action A100, the user device 110 may receive, from the authenticator device 120, the response indicating success or failure of the authentication.

Modulating One-time Password Into Acoustic Signal, i.e., the Second Acoustic Signal In action A030, the user device 110 generates the one-time password, e.g., a sequence of characters, numbers, alpha numeric digits, etc. The sequence of characters is subsequently encoded in a sequence of bits, using a character set, including but not limited to American Standard Code for Information Interchange (ASCII), character sets derived by International Organization for Standardization (ISO), Unicode, etc. Next, the bits are modulated onto a carrier audio wave, which will transfer the one-time password to the authenticator device 120 over the air in the form of the second acoustic signal. The carrier audio wave may be a sinusoidal signal, music, speech or the like.

The modulation of the bits may be based on keying, e.g., assigning binary 0 to one value and binary 1 to another. In case, the value modified is the frequency of the acoustic signal, then the modulation method is called Frequency-Shift Keying (FSK). In case, the amplitude is modified, the method is called Amplitude-Shift Keying (ASK). In case, the phase changes, the method is called Phase Shift Keying (PSK). A choice of modulation method may depend on the use case, for example some methods are good in dealing with background noise while others are good for authentication over relatively large distances.

The authenticator device 120 receives the acoustic signal, demodulates it, decodes it using the same character set used to encode the one-time password and submits the one-time password for verification of authenticity. The authentication device 120 checks whether the one-time password is valid and performs action based on the result.

Figure 3:
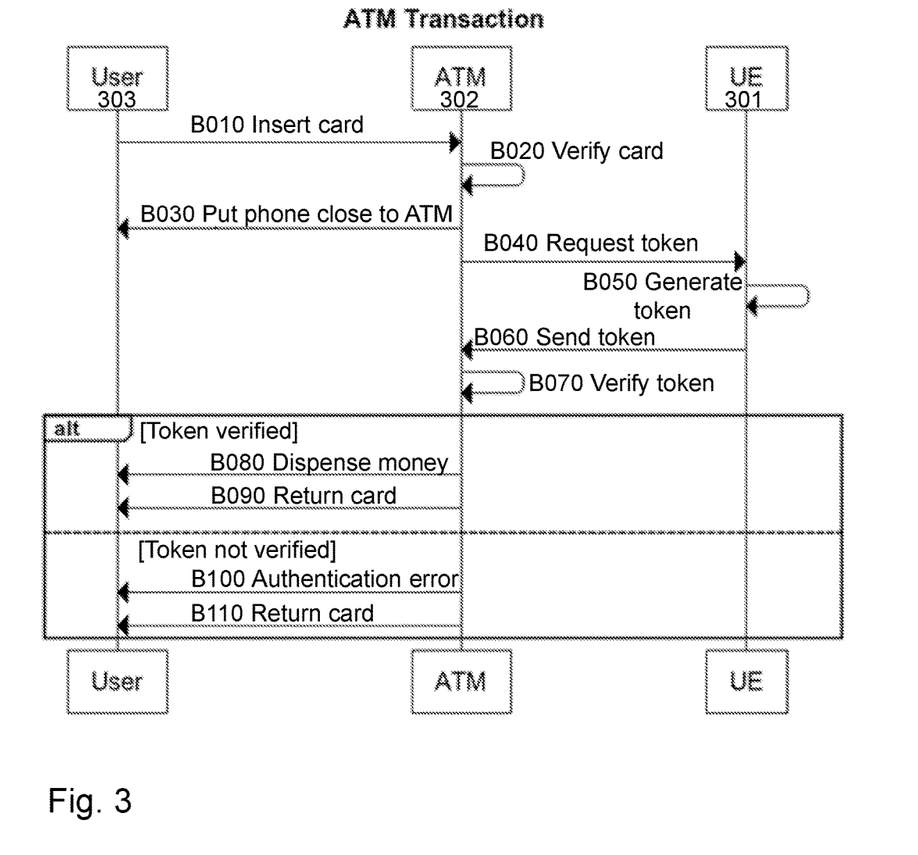
FIG. 3 is another combined signaling and flowchart illustrating the methods herein.
Figure 4:
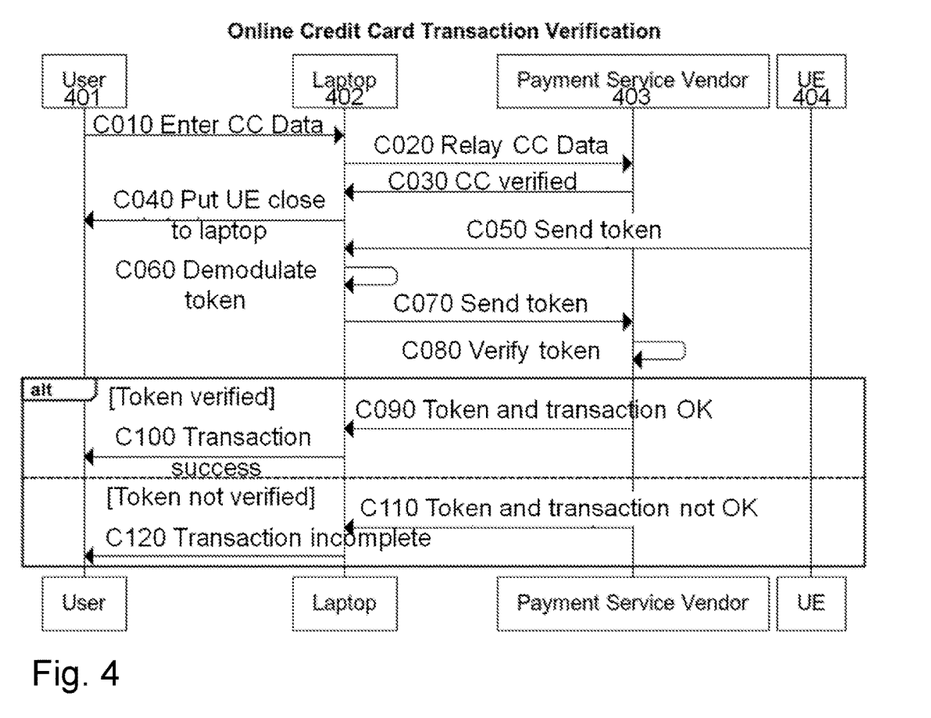
FIG. 4 is a further combined signaling and flowchart illustrating the methods herein.

With reference to FIG. 3, a method for two-stage authentication using the acoustic signal according to one of the embodiments above is illustrated by means of a combined signaling scheme and flowchart. The two-stage authentication involves the user device 110, including but not limited to a mobile phone, a watch, a bracelet, etc., and the authenticator device 120. Here, the user device 110 is illustrated as a user equipment 301 (UE) and the authenticator device 120 is illustrated as an ATM 302. Furthermore, a user 303 of the user device 110 is involved in some actions.

One or more of the following action may be performed in any suitable order.

Action B010

The user 303 inserts a magnetic card, such as a credit card or the like, into the ATM 302.

Action B020

The ATM 302 verifies that the credit card is valid. This may mean that the ATM 302 checks, e.g., verifies by contacting a remote server, that the credit card is issued by an issuer of credit cards, e.g., managing the remote server, that is allowed to use the ATM 302. Moreover, the verification of the credit card may include that the ATM 302 checks that the credit card is active, i.e., allowed to be used for payments/withdrawal. Moreover, the ATM 302 may verify that the credit card is not blocked, e.g., by the user or a company, such as the issuer of the credit card.

Action B030

The ATM 302 may, e.g., via speakers or a display, instruct the user to put the UE 301 close to the ATM 302. When the ATM 302 uses the speaker, a voice may instruct the user to put the UE 301 close to the ATM. Of course, the voice includes frequencies in the audible spectra. Similarly, when the ATM 302 uses the display a message with text like "please put your phone close to the machine" may be displayed at the display of the ATM 302. The only user interaction that may be required is that of ensuring proximity of the authenticator device 120 with the user device 110 and possibly that the volume/sound is switched on, depending on how the speaker is configured.

Action B040

When the UE 301 is close to the ATM 302, the ATM 302 may send a request for a one time security token, aka the one-time password, as an acoustic signal to the UE 301. Authentication, e.g., as in action B070, may be triggered on request from the authenticator device 120 as in action B040, or the authentication may be triggered by the user device 110.

Action B050

In response to action B040, the UE 301 may generate the one-time security token according to known manners.

Action B060

After action B050, the UE 301 may send the one-time security token as another acoustic signal to the ATM 302.

Action B070

Upon receiving the one-time security token, the ATM 302 may verify the security token according to known manners.

As a first alternative, actions B080 and B090 may be performed when the security token has been successfully verified as correct by the ATM 302.

Action B080

The ATM dispenses money, which the user 303 may gather, or simply take.

Action B090

In a further action, the ATM 302 returns the magnetic card, e.g., by ejecting the magnetic card out of the ATM 302. Thereby, the user 303 is allowed to grab the magnetic card and e.g., put it in the user's 303 wallet.

As a second alternative, actions B090 and B100 may be performed when the security token has not been successfully verified, i.e., the security token was erroneous.

Action B100

The ATM 302 may inform the user 303, e.g., by means of speakers or display as above, that the authentication failed. Possibly, the user 303 may retry, i.e., the UE 301 may retry in sending the security token according to action B060.

Action B110

If the retries fails, or if no retry is allowed, the ATM 302 returns the magnetic card similarly to action B090.

Summarizing the scenario above, it concerns users with smartphones and a magnetic stripe card, or microchip card, wishing to conduct financial transactions using a bank's Automated Teller Machine (ATM). In this case, the authenticator is the ATM machine itself, which also actuates cash dispersal to the user. The UE is the mobile device of the user, which is used to generate a one-time security token instead of the usual 4-digit Personal Identification Number (PIN) code and transmits this code to the ATM via audio waves. Note that a security advantage from the application of this scenario against current state of art in ATMs is that card skimming attempts can be prevented, as audio waves effectively replace PIN code input; card skimming are cases where fake keypads are placed on top of the ATM to log the PIN number of users.

FIG. 4 illustrates a further embodiment of a two-stage authorization method. The method concerns a user 401 with a UE 404, e.g., phone, user device or the like, wishing to authenticate a payment the user made online, e.g., at a web-shop or the like. A payment service vendor 403, e.g., realized by a so called cloud service, may provide the web-shop or the like. Furthermore, the use 401 uses a laptop 402, such as personal computer, tablet PC or desktop, to access the web shop. With this method, the authenticator device 120 according to the embodiments above may be an arrangement comprising the laptop 402 and the payment service vendor 403.

One or more of the following actions may be performed in any suitable order.

Action C010

The user 401 enters credit card (CC) data at the laptop 402, e.g., using a keyboard of the laptop 402. The credit card data may include one or more of number of the credit card, expiration date of the credit card, name of owner of the credit card, etc.

Action C020

The laptop 402 relays the credit card data to the payment service vendor 403.

Action C030

The payment service vendor 403 sends an indication whether the credit card data was successfully or unsuccessfully verified.

Action C040

The laptop 402 provides instructions to the user 401 indicating that the phone is to be put close to the laptop 402, e.g., by means of speakers or display similarly to action B030 of the method illustrated in FIG. 3.

Action C050

The UE 404 sends the one-time token to the laptop 402 as an acoustic signal.

Action C060

After receiving the one-time token, the laptop 402 demodulates, e.g., decodes, the acoustic signal.

Action C070

The laptop 402 sends the one-time token to the payment service vendor 403.

Action C080

The payment service vendor 403 verifies the one-time token.

As a first alternative, action C090 and C100 may be performed.

Action C090

The payment service vendor 403 has successfully verified the token and concludes that the transaction is allowed.

Action C100

The laptop 402 indicates that the transaction was successful to the user 401, e.g., by means of a message on the screen of the laptop 402 or speakers of the laptop 402 as explained above.

As a second alternative, action C110 and C120 may be performed.

Action C110

The payment service vendor 403 finds that the token is not correct and concludes that the transaction is not allowed.

Action C120

The laptop 402 thus indicates that the transaction was unsuccessful to the user 401, again for example by means of speaker of display of the laptop 402.

Figure 5:
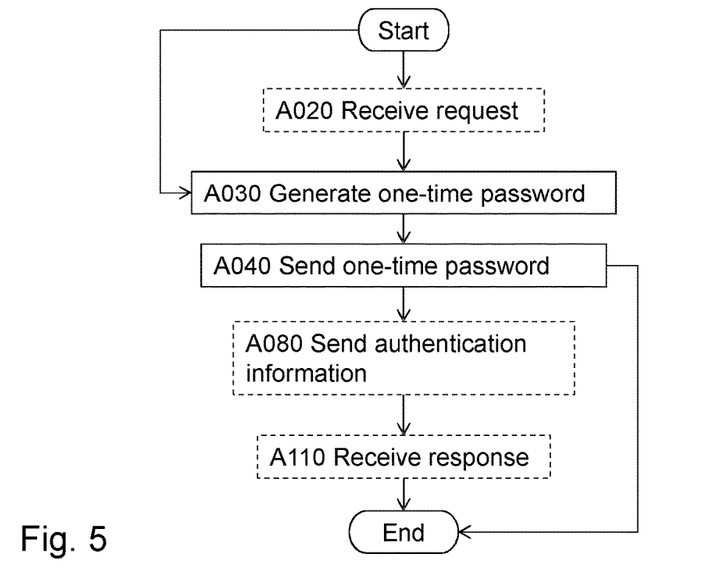
FIG. 5 is a flowchart illustrating embodiments of the method in the user device.

In FIG. 5, a schematic flowchart of exemplifying methods in the user device 110 is shown. Again, the same reference numerals as above have been used to denote the same or similar features, in particular the same reference numerals have been used to denote the same or similar actions. Accordingly, the user device 110 performs a method for authentication of the user device 110.

One or more of the following actions may be performed in any suitable order.

Action A020

The user device 110 may receive a request for the one-time password from the authenticator device 120.

The request may comprise one or more of: time of the request, location of the authenticator device 120 and identity of the authenticator device 120.

Action A030

The user device 110 generates a one-time password. The generating A030 of the one-time password may be based on the request.

Action A040

The user device 110 sends, to an authenticator device 120, the one-time password as an acoustic signal, wherein the acoustic signal comprises a frequency within an ultrasound range or an infrasound range. The ultrasound range may comprise frequencies above 20 000 Hz and the infrasound range may comprise frequencies below 20 Hz.

Action A080

The user device 110 may send, to the authenticator device 120, authentication information, being independent of the one-time password.

Action A110

The user device 110 may receive, from the authenticator device 120, a response indicating success or failure of the authentication.

Figure 6:
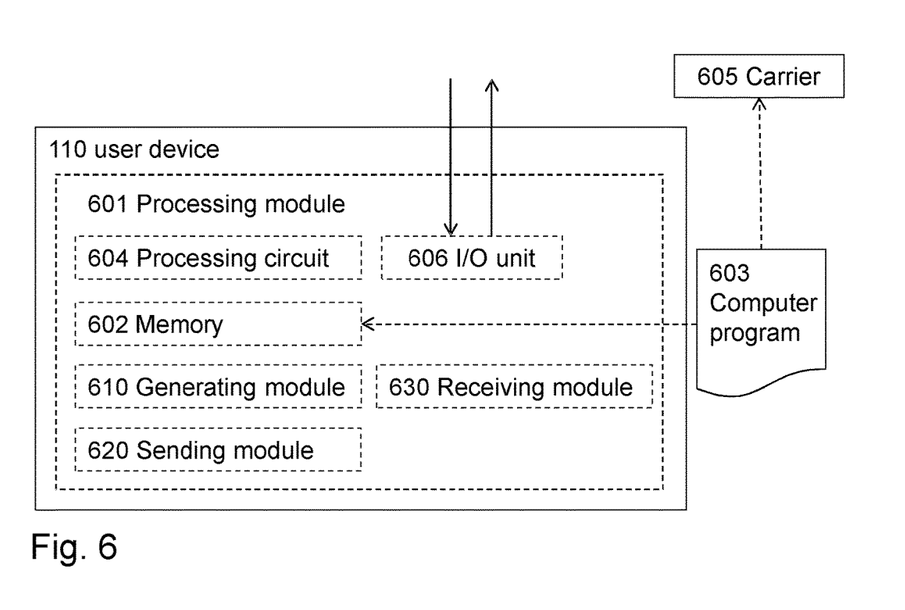
FIG. 6 is a block diagram illustrating embodiments of the user device.

With reference to FIG. 6, a schematic block diagram of embodiments of the user device 110 of FIG. 1 is shown.

The user device 110 may comprise a processing module 601, such as a means, one or more hardware modules and/or one or more software modules for performing the methods described herein.

The user device 110 may further comprise a memory 602. The memory may comprise, such as contain or store, a computer program 603.

According to some embodiments herein, the processing module 601 comprises, e.g., 'is embodied in the form of' or 'realized by', a processing circuit 604 as an exemplifying hardware module. In these embodiments, the memory 602 may comprise the computer program 603, comprising computer readable code units executable by the processing circuit 604, whereby the user device 110 is operative to perform the methods of FIGS. 2-5.

In some other embodiments, the computer readable code units may cause the user device 110 to perform the method according to FIGS. 2-5 when the computer readable code units are executed by the user device 110.

FIG. 6 further illustrates a carrier 605, or program carrier, which comprises the computer program 603 as described directly above.

In some embodiments, the processing module 601 comprises an Input/Output unit 606, which may be exemplified by a receiving module and/or a sending module as described below when applicable.

In further embodiments, the processing module 601 may comprise one or more of a generating module 610, a sending module 620 and a receiving module 630, as exemplifying hardware modules. In other examples, one or more of the aforementioned exemplifying hardware modules may be implemented as one or more software modules.

According to the embodiments herein, the user device 110 is thus configured for authentication of the user device 110.

With the various embodiments described above, the user device 110, the processing module 601 and/or the generating module 610 is configured for generating a one-time password.

Furthermore, the user device 110, the processing module 601 and/or the sending module 620 is configured for sending, to an authenticator device 120, the one-time password as an acoustic signal, wherein the acoustic signal comprises a frequency within an ultrasound range or an infrasound range. The ultrasound range may comprise frequencies above 20 000 Hz and the infrasound range may comprise frequencies below 20 Hz.

In some embodiments, the user device 110, the processing module 601 and/or the sending module 620 may be configured for sending, to the authenticator device 120, authentication information, being independent of the one-time password.

The user device 110, the processing module 601 and/or the receiving module 630 may be configured for receiving a request for the one-time password from the authenticator device 120, wherein the user device 110 is configured for generating the one-time password based on the request.

The request may comprise one or more of: time of the request, location of the authenticator device 120 and identity of the authenticator device 120.

The user device 110, the processing module 601 and/or the receiving module 630 may be configured for receiving, from the authenticator device 120, a response indicating success or failure of the authentication.

Figure 7:
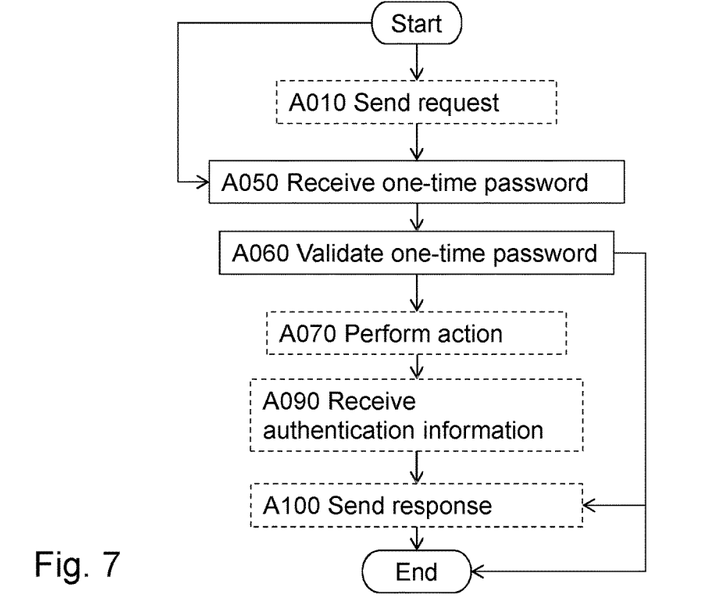
FIG. 7 is a flowchart illustrating embodiments of the method in the authenticator device.

In FIG. 7, a schematic flowchart of exemplifying methods in the authenticator device 120 is shown. Again, the same reference numerals as above have been used to denote the same or similar features, in particular the same reference numerals have been used to denote the same or similar actions. Accordingly, the authenticator device 120 performs a method for authentication of a user device 110.

One or more of the following actions may be performed in any suitable order.

Action A010

The authenticator device 120 may send, to the user device 110, a request for the one-time password, wherein the request may comprise one or more of: time of the request, location of the authenticator device 120 and identity of the authenticator device 120.

Action A050

The authenticator device 120 receives, from the user device 110, a one-time password as an acoustic signal, wherein the acoustic signal comprises a frequency within an ultrasound range or an infrasound range. The ultrasound range may comprise frequencies above 20 000 Hz and the infrasound range may comprise frequencies below 20 Hz.

Action A060

The authenticator device 120 validates the one-time password.

The validating A060 of the one-time password may be based on one or more authenticator parameters, wherein the one or more authenticator parameters may comprise location of the authenticator device 120 and/or identity of the authenticator device 120.

The validating A060 of the one-time password may be based on the request.

Action A070

The authenticator device 120 may perform an action based on the outcome of Action A060. Thus, action A070 may preferably be performed after action A060.

Action A090

The authenticator device 120 may receive, from the user device 110, authentication information, being independent of the one-time password.

Action A100

The authenticator device 120 may send a response, indicating success or failure of the authentication, to the user device 110. Action A100 is preferably performed after action A060. The response may relate to authentication by means of the one-time password and/or by means of the authentication information.

Figure 8:
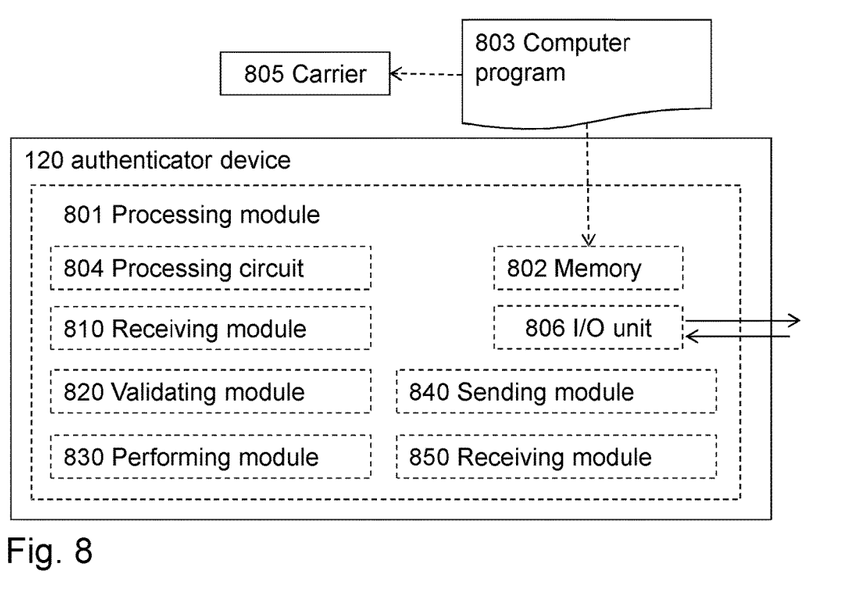
FIG. 8 is a block diagram illustrating embodiments of the authenticator device.

With reference to FIG. 8, a schematic block diagram of embodiments of the authenticator device 120 of FIG. 1 is shown.

The authenticator device 120 may comprise a processing module 801, such as a means, one or more hardware modules and/or one or more software modules for performing the methods described herein.

The authenticator device 120 may further comprise a memory 802. The memory may comprise, such as contain or store, a computer program 803.

According to some embodiments herein, the processing module 801 comprises, e.g., 'is embodied in the form of' or 'realized by', a processing circuit 804 as an exemplifying hardware module. In these embodiments, the memory 802 may comprise the computer program 803, comprising computer readable code units executable by the processing circuit 804, whereby the authenticator device 120 is operative to perform the methods of FIGS. 2-4 and/or FIG. 7.

In some other embodiments, the computer readable code units may cause the authenticator device 120 to perform the method according to FIGS. 2-4 and/or FIG. 7 when the computer readable code units are executed by the authenticator device 120.

FIG. 8 further illustrates a carrier 805, or program carrier, which comprises the computer program 803 as described directly above.

In some embodiments, the processing module 801 comprises an Input/Output unit 806, which may be exemplified by a receiving module and/or a sending module as described below when applicable.

In further embodiments, the processing module 801 may comprise one or more of a receiving module 810, a validating module 820, a performing module 830, a sending module 840 and a receiving module 850, as exemplifying hardware modules. In other examples, one or more of the aforementioned exemplifying hardware modules may be implemented as one or more software modules.

According to the embodiments herein, the authenticator device 120 is thus configured for authentication of a user device 110.

With the various embodiments described above, the authenticator device 120, the processing module 801 and/or the receiving module 810 is configured for receiving, from the user device 110, a one-time password as an acoustic signal, wherein the acoustic signal comprises a frequency within an ultrasound range or an infrasound range. The ultrasound range may comprise frequencies above 20 000 Hz and the infrasound range may comprise frequencies below 20 Hz.

Moreover, the authenticator device 120, the processing module 801 and/or the validating module 820 is configured for validating the one-time password.

The authenticator device 120, the processing module 801 and/or the validating module 820 may be configured for validating the one-time password based on one or more authenticator parameters, wherein the one or more authenticator parameters may comprise location of the authenticator device 120 and/or identity of the authenticator device 120.

The authenticator device 120, the processing module 801 and/or the validating module 820 may be configured for validating the one-time password based on the request.

The authenticator device 120, the processing module 801 and/or the sending module 840 may be configured for sending, to the user device 110, a request for the one-time password, wherein the request may comprise one or more of: time of the request, location of the authenticator device 120 and identity of the authenticator device 120.

The authenticator device 120, the processing module 801 and/or the receiving module 850 may be configured for receiving, from the user device 110, authentication information, being independent of the one-time password.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "action" may refer to an action, a step, an operation, a response, a reaction, an activity or the like.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g., Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g., a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a user device, for authentication of the user device, wherein the method comprises:
   receiving a request for a one-time password, wherein the request was transmitted by an authenticator device, and wherein the request comprises location information indicating a location of the authenticator device and time information indicating the time at which the request was sent;
   in response to the request, generating a one-time password based on the time information and the location information; and
   sending to the authenticator device the one-time password as an acoustic signal, wherein the acoustic signal comprises a frequency within an ultrasound range or an infrasound range.

2. The method of claim 1, wherein the method further comprises:
receiving, from the authenticator device, a response indicating success or failure of the authentication.

3. The method of claim 1, wherein the method further comprises:
sending, to the authenticator device, authentication information, being independent of the one-time password.

4. A method, performed by an authenticator device, for authentication of a user device, wherein the method comprises:
determining that the user device is in the proximity of the authenticator device;
in response to determining that the user device is in the proximity of the authenticator device, transmitting to the user device a request for a one-time password, wherein the request for the one-time password comprises location information indicating a location of the authenticator device and time information indicating the time at which the request was sent;
receiving, from the user device, the requested one-time password as an acoustic signal, wherein the acoustic signal comprises a frequency within an ultrasound range or an infrasound range; and
validating the one-time password.

5. The method of claim 4, wherein the validating of the one-time password is based on one or more authenticator parameters, wherein the one or more authenticator parameters comprises location of the authenticator device.

6. The method of claim 4, wherein the validating of the one-time password is based on the request.

7. The method of claim 4, wherein the method further comprises:
receiving, from the user device, authentication information, being independent of the one-time password.

8. The method of claim 4, wherein determining that the user device is in the proximity of the authenticator device comprises receiving a signal transmitted by the user device; determining a received power of the received signal; and determining that the received power is above a threshold.

9. A user device configured for authentication of the user device, wherein the user device is configured for:
receiving a request for a one-time password, wherein the request was transmitted by an authenticator device, and wherein the request comprises location information indicating a location of the authenticator device and time information indicating the time at which the request was sent;
in response to the request, generating a one-time password based on the time information and the location information; and
sending to the authenticator device the one-time password as an acoustic signal, wherein the acoustic signal comprises a frequency within an ultrasound range or an infrasound range.

10. The user device of claim 9, wherein the user device is configured for receiving, from the authenticator device, a response indicating success or failure of the authentication.

11. The user device of claim 9, wherein the user device is configured for sending, to the authenticator device, authentication information, being independent of the one-time password.

12. An authenticator device configured for authentication of a user device, wherein the authenticator device is configured for:
determining that the user device is in the proximity of the authenticator device;
in response to determining that the user device is in the proximity of the authenticator device, transmitting to the user device a request for a one-time password, wherein the request for the one-time password comprises location information indicating a location of the authenticator device and time information indicating the time at which the request was sent;
receiving, from the user device, the requested on-time password as an acoustic signal, wherein the acoustic signal comprises a frequency within an ultrasound range or an infrasound range; and
validating the one-time password.

13. The authenticator device of claim 12, wherein the authenticator device is configured for validating the one-time password based on one or more authenticator parameters, wherein the one or more authenticator parameters comprises the location information.

14. The authenticator device of claim 12, wherein the request for the one-time password further comprises and identity of the authenticator device.

15. The authenticator device of claim 14, wherein the authenticator device is configured for validating the one-time password based on the request.

16. The authenticator device of claim 12, wherein the authenticator device is configured for receiving, from the user device, authentication information, being independent of the one-time password.

17. The authenticator device of claim 12, wherein determining that the user device is in the proximity of the authenticator device comprises receiving a signal transmitted by the user device; determining a received power of the received signal; and determining that the received power is above a threshold.

18. A computer program product comprising a non-transitory computer readable medium storing a computer program comprising computer readable code units which when executed on a user device causes the user device to perform the steps of:
receiving a request for a one-time password, wherein the request was transmitted by an authenticator device, and wherein the request comprises location information indicating a location of the authenticator device and time information indicating the time at which the request was sent;
in response to the request, generating a one-time password based on the time information and the location information; and
sending to the authenticator device the one-time password as an acoustic signal, wherein the acoustic signal comprises a frequency within an ultrasound range or an infrasound range.

19. A computer program product comprising a non-transitory computer readable medium storing a computer program, comprising computer readable code units which when executed on an authenticator device causes the authenticator device to perform the steps of:
determining that the user device is in the proximity of the authenticator device;
in response to determining that the user device is in the proximity of the authenticator device, transmitting to the user device a request for a one-time password, wherein the request for the one-time password comprises location information indicating a location of the authenticator device and time information indicating the time at which the request was sent;
receiving, from the user device, the requested one-time password as an acoustic signal, wherein the acoustic signal comprises a frequency within an ultrasound range or an infrasound range; and validating the one-time password.

* * * * *